Patented June 16, 1931

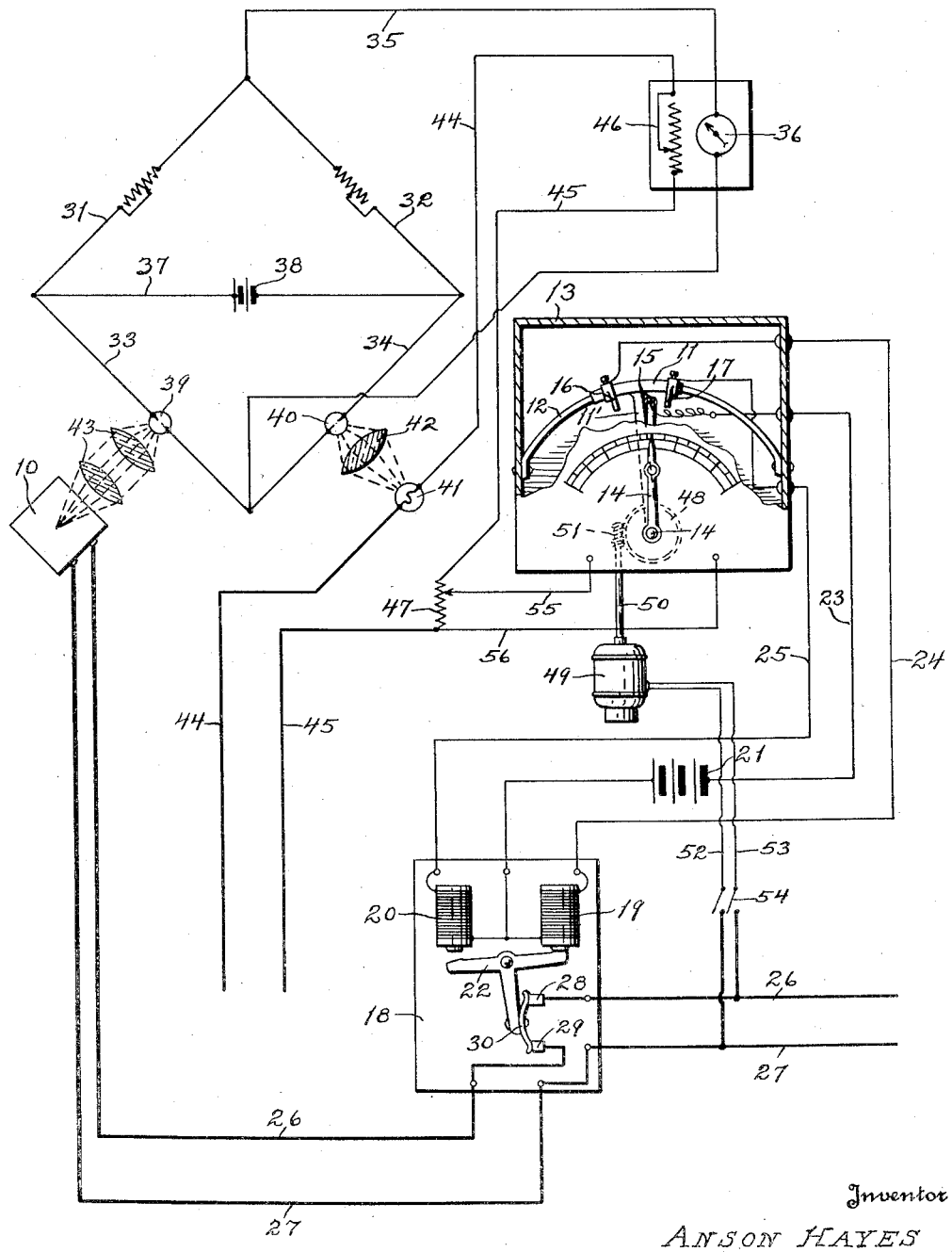

1,810,172

UNITED STATES PATENT OFFICE

ANSON HAYES, OF AMES, IOWA

SYSTEM OF TEMPERATURE CONTROL

Application filed November 6, 1926. Serial No. 146,739.

The primary object of this invention is to provide an electrically operated means for automatically controlling the temperature and the rates of heating and cooling of a heating device such as a furnace, by relay connections with a device for measuring and indicating the temperature, and so arranged as to regulate the supply of heating or heat producing medium to the heating device in accordance with the indicated rise and fall of temperature.

A further object is to provide means for automatically maintaining the temperature of a heating device within certain predetermined limits, by controlling the supply of fuel or energy to said device in accordance with variations in such temperature, as measured through the action of photo-electric cells.

Still another object of this invention is to provide an improved arrangement of instrumentalities including a Wheatstone bridge circuit embodying two photo-electric cells adapted to be exposed respectively to radiation from standard light and from a hot body whose temperature is to be regulated, together with an indicating instrument having connections through suitable relay devices whereby the supply of heat producing medium to the hot body may be regulated and controlled and the rates of heating and cooling of the hot body may also be regulated and controlled.

With these and other objects in view, my invention consists in the combination and arrangement of instrumentalities as hereinafter set forth, pointed out in the claims and illustrated by the accompanying drawing, which is a diagrammatic representation of the various instrumentalities employed and their electrical connections.

I have used the numeral 10 to represent a hot body such as a high temperature furnace whose temperature is to be regulated and controlled. A Wheatstone bridge circuit is employed and the arms thereof are designated by the numerals 31, 32, 33, and 34, while the numeral 35, is the bridge wire which contains a galvanometer 36. The numeral 37 is applied to the main circuit wire containing a suitable source of electrical energy such as a battery 38. The wires 31 and 32 comprise or include standard resistances while the arms 33 and 34 have as part of their resistance units, photo-electric cells 39 and 40 respectively, which may be of selenium or other suitable substance the resistance of which is affected by radiation of light or heat. The cell 40 is arranged to be exposed to radiation from a standard light 41, as by means of a lens 42 and a suitable filter or filters; while the cell 39 is exposed to radiation from the furnace 10, any suitable device, designated by the lenses 43 and including suitable filters, being employed for directing a desired portion of the radiation from the furnace upon said cell 39.

The filament of the standard lamp 41 is in a circuit including the wires 44 and 45, connected with any source of E. M. F., either direct or alternating current, and including a rheostat 46 with any suitable Wheatstone bridge balancer or rheostat operator, which preferably is automatically operated. The member 46 may be any suitable mechanical device of common form for maintaining the balanced condition of the photo-electric cells in the Wheatstone bridge circuit, and it may be arranged for either manual or automatic operation in a common and well known manner. This circuit also includes a standard resistance or milliammeter of suitable form such as 47.

A suitable automatic indicating instrument is employed which is shown more or less conventionally and designated generally by the numeral 13. This indicating device may be any suitable instrument for indicating voltage or current or any function thereof, such for instance as a potentiometer. The device 13 includes a movable member such as a needle 14, and I have here shown this movable member as operatively connected with a circuit making or contact member 15 which is movable therewith. Suitably spaced apart upon a carriage 11, slidable on a segment 12 on the instrument 13 and adapted for contact by the member 15, are contact points 16 and 17, which may be adjustable if desired, so as to vary their location and spacing. The carriage 11 is mounted on an arm 11' which has a bearing on the pivot 14' of the needle 14, and the segment 12 is arranged concentrically of said pivot. Connected with the arm 11' is a suitable gear such as a worm wheel 48, indicated by dotted lines. A constant speed motor 49 has its armature shaft 50 extended within the device 13 and carries on its end a worm 51 meshing with the worm wheel 48. As the motor is operated, the arm 11' is moved progressively from left to right carrying the carriage 11 along the segment 12. This causes a progressive advance of the spaced contact members 16 and 17. The motor 49 is supplied with current through a circuit 52—53 including a switch 54 and said circuit may be connected with any source of energy such as the feed circuit 26—27.

A relay device is designated generally by the numeral 18 and is electrically connected with the indicating device 13. The relay device 18 in this instance includes two solenoid coils 19 and 20, a relay battery 21 or other suitable source of E. M. F., and a pivoted armature 22 operable selectively by the coils 19 and 20 for operating switches, valves or other controlling devices for regulating the source or supply of fuel or energy to the furnace 10. The coils 19 and 20 and the battery 21 are connected by a common conductor 23 to the movable contact member 15 on the instrument 13, and said coils are connected respectively, by conductors 24 and 25, to the respective contact points 16 and 17, whereby a circuit may be made through either of said coils upon contact of the member 15 with the corresponding point.

I have indicated two conductors 26 and 27 leading from a source of fuel or energy for the furnace, extended to the relay device 18, and thence to the furnace 10 or heating device to be supplied and controlled. The conductors 26 and 27 may be presumed to represent means for supplying electrical energy for heating the furnace, or they may represent means for electrically controlling the supply of other heating means, such as gas or the like. The conductors 26 and 27 are normally in open circuit through contact points 28 and 29 located at the relay device 18, and adapted to be closed at times by means of a switch device 30 which may be associated with or operated by the armature 22, or be integrally connected therewith. In any event, the circuit is adapted to be closed at times by the switch 30 whereby the heating medium is supplied to the furnace. Or the armature 22 may be connected directly with other controlling means such as a valve for regulating the supply of heating medium in its passage to the furnace, and it is to be understood that the accompanying drawing is to illustrate one type of control which may be employed for accomplishing my purpose.

The pyrometer, including the photo-electric cells 39 and 40 and the Wheatstone bridge circuit, operates to indicate changes of temperature in the furnace 10, and the instrument 13 indicates such changes of temperature by the movement of the needle 14 on its dial. The galvanometer 36 is deflected by any change in the relative intensities of radiation from the furnace 10 and that of the standard light 41. The galvanometer deflection is again returned to zero by changing the resistance 46 in series with the filament of the standard light 41. The changes in intensities of the radiation from the furnace and from the standard light cause corresponding changes in the resistance of the photo-electric cells 39 and 40. The temperature of the furnace is determined by the current flowing through the filament of the standard light, or by measurement of any suitable function of this current such as the measurement of the potential drop across the standard resistance 47 in the filament circuit of the light.

The process above outlined involves the following coaction of parts: Assuming that an increase occurs in the temperature of the hot body 10, there then occurs a decrease in the resistance of the photo-electric cells 39 exposed to radiation from said hot body; this decrease causes a deflection of the galvanometer 36, which in turn requires a decrease in the resistance of the circuit of the standard lamp 41; the temperature of the filament of the standard lamp is thus increased, which results in a decrease of the resistance of the photo-electric cell 40 exposed to radiation therefrom. This coaction continues until the original galvanometer deflection is reduced to zero. It is apparent then that by measuring the change that has taken place in the current of the standard lamp (or any function thereof) it may be determined what change has taken place in the temperature of the hot body 10 or the radiation therefrom.

When the heating of the furnace 10 has been commenced by the application of whatever heat producing medium is designed to be applied thereto, the motor 49 is set in operation and through the gearing 51—48, causes the carriage 11 to be moved progressively in one direction on the segment 12, said carriage carrying with it the spaced contact members 16 and 17. The needle 14, due to its electrical connections with the pyrometer is also presumed to move in the same direction as the carriage as the temperature rises. This member 15 moves with the needle 14 and normally remains between and out of contact with the members 16 and 17. In the event the temperature of the furnace 10 rises more rapidly than is desired, the needle 14 and member 15, moving more rapidly than the carriage 11, will cause a contact of the member 15 with one of the contact members such as 17, which establishes a circuit through the wires 23 and 25 and energizes the coil 20.

This results in attracting the armature 22 to the coil 20, moving the switch 30 to open position and breaking the circuit through the conductors 26 and 27, or otherwise shutting off the supply of heating medium to the furnace. The carriage continues to travel on the segment 12, and as the rise of temperature has been restricted by the action just described, the contact member 16 will gradually approach and finally contact with the member 15, which establishes a circuit through the wires 23 and 24 and energizes the coil 19. This results in attracting the armature 22 to the coil 19, to the position shown in the drawing, causes the switch 30 to close by contact with the points 28 and 29 and establishes a circuit through the conductors 26 and 27, resulting in a renewal of the heating medium to the furnace and a consequent continuation of the rise of temperature therein.

It will thus be apparent that I have provided a means for automatically controlling, by suitable means such as a system of relays, the rates of heating and cooling or of maintaining any suitable temperature of the hot body, through a connection with the indicating devices or any of the automatically operating rheostat operators suitable for maintaining the balanced condition of the Wheatstone bridge. It is also apparent that the relay system may be employed for operating and controlling or regulating devices, such as switches or valves, for temperature control of heating devices such as furnaces.

As the contact members 16 and 17 are adjustable on the carriage 11, it is obvious that the device may be adjusted for controlling the rise and fall of temperature within narrow or broad limits as desired. It is obvious that the rates of cooling of the furnace may also be controlled in a similar manner.

I claim as my invention:—

1. A system for controlling the temperature of a hot body, comprising an electrical circuit arranged to control the supply of heat-producing energy thereto and normally in open circuit, a pyrometer which is responsive to the temperature of said hot body, including a Wheatstone bridge in said circuit, two arms of said bridge containing photoelectric cells, a standard light in said circuit, one of said cells arranged to receive radiations from said standard light and another arranged to receive radiations from the hot body, means for changing the resistance of the circuit through the standard light, and means for measuring the potential drop in the circuit through said standard light, an instrument for indicating the variations in temperature of the hot body, and including a movable member, connections between said pyrometer and said instrument for actuating said movable member in accordance with such temperature variations, a pair of spaced contact points associated with said instrument arranged for constant conjunctive travel and adapted for contact by said movable member, a relay device including a pair of electro-magnets and an armature selectively operable by said magnets for closing or opening the circuit above mentioned, and electrical connections between said magnets and the respective contact points.

2. A system for controlling the temperature of a hot body, comprising an electrical circuit arranged to control the supply of heat-producing energy thereto and normally in open circuit, a pyrometer which is responsive to the temperature of said hot body, including a Wheatstone bridge in said circuit, two arms of said bridge containing photoelectric cells, a standard light in said circuit, one of said cells arranged to receive radiations from said standard light and another arranged to receive radiations from the hot body, means for changing the resistance of the circuit through the standard light, and means for measuring the potential drop in the circuit through said standard light, an instrument for indicating the variations in temperature of the hot body, and including a movable member, connections between said pyrometer and said instrument for actuating said movable member in accordance with such temperature variations, a pair of spaced contact points associated with said instrument arranged for constant and uniform conjunctive travel in the same general direction as said movable member and adjustable relative to each other, and adapted for contact by said movable member, a relay device including a pair of electro-magnets and an armature selectively operable by said magnets for closing or opening the circuit above mentioned, and electrical connections between said magnets and the respective contact points.

3. A system for controlling the temperature of a hot body, comprising an electrical circuit arranged to control the supply of heat-producing energy thereto and normally in open circuit, a pyrometer which is responsive to the temperature of said hot body, including a Wheatstone bridge in said circuit, two arms of said bridge containing photoelectric cells, a standard light in said circuit, one of said cells arranged to receive radiations from said standard light and another arranged to receive radiations from the hot body, means for changing the resistance of the circuit through the standard light, and means for measuring the potential drop in the circuit through said standard light, an instrument for indicating the variations in temperature of the hot body, and including a movable member arranged for travel in accordance with changes of temperature as determined by said pyrometer, connections between said pyrometer and said instrument for actuating said movable member in accordance with such temperature variations, a carriage arranged for constant travel, a pair of spaced contact points associated with said carriage and adapted for contact by said movable member, a relay device including a pair of electro-magnets and an armature selectively operable by said magnets for closing or opening the circuit above mentioned, and electrical connections between said magnets and the respective contact points.

4. A system for controlling the temperature of a hot body, comprising an electrical circuit arranged to control the supply of heat-producing energy thereto, a pyrometer which is responsive to the temperature of said hot body, including a Wheatstone bridge in said circuit, two arms of said bridge containing photoelectric cells, a standard light in said circuit, the cells of one of said arms being exposed to radiations from the standard light and those of the other being exposed to radiations from the hot body, means for changing resistance of the circuit through said standard light, and means for measuring a function of the current flowing through the circuit of said standard light, an instrument for indicating the variations in temperature of the hot body, and including a movable member arranged for travel in accordance with changes of temperature as determined by said pyrometer, connections between said pyrometer and said instrument for actuating said movable member in accordance with such temperature variations, a segmental track associated with said instrument, a carriage mounted for travel on said segmental track, a pair of spaced contact points associated with said carriage and adapted for contact by said movable member, means for imparting a uniform continuous movement to said carriage, a relay device including a pair of electro-magnets and an armature selectively operable by said magnets for controlling the circuit above mentioned, and electrical connections between said magnets and the respective contact points.

5. A system for controlling the temperature of a hot body, comprising an electrical circuit arranged to control the supply of heat-producing energy thereto, a pyrometer which is responsive to the temperature of said hot body, including a Wheatstone bridge in said circuit, two arms of said bridge containing photoelectric cells, a standard light in said circuit, the cells of one of said arms being exposed to radiations from the standard light and those of the other being exposed to radiations from the hot body, means for changing resistance of the circuit through said standard light, and means for measuring a function of the current flowing through the circuit of said standard light, an instrument for indicating the variations in temperature of the hot body, and including a movable member arranged for travel in accordance with changes of temperature as determined by said pyrometer, connections between said pyrometer and said instrument for actuating said movable member in accordance with such temperature variations, a segmental track associated with said instrument, a carriage mounted for travel on said segmental track, a pair of spaced contact points associated with said carriage and adapted for contact by said movable member, a constant speed motor, operable connections between said motor and said carriage for moving the latter continuously at uniform speed, a relay device including a pair of electro-magnets and an armature selectively operable by said magnets for controlling the circuit above mentioned, and electrical connections between said magnets and respective contact points.

ANSON HAYES.